(12) United States Patent
Hayashi et al.

(10) Patent No.: US 7,483,219 B2
(45) Date of Patent: Jan. 27, 2009

(54) IMAGING APPARATUS AND DRIVING METHOD OF ITS IMAGING OPTICAL SYSTEM

(75) Inventors: Kenichi Hayashi, Kadoma (JP); Takayuki Hayashi, Kadoma (JP); Eiichi Nagaoka, Kadoma (JP); Keiji Sakamoto, Kadoma (JP); Naoto Yumiki, Kadoma (JP); Daisuke Ito, Kadoma (JP)

(73) Assignee: Panasonic Corporation, Osaka (JP)

( * ) Notice: Subject to any disclaimer, the term of this patent is extended or adjusted under 35 U.S.C. 154(b) by 490 days.

(21) Appl. No.: 11/407,709

(22) Filed: Apr. 20, 2006

(65) Prior Publication Data

US 2006/0238882 A1   Oct. 26, 2006

(30) Foreign Application Priority Data

Apr. 21, 2005   (JP) ............................ 2005-123790

(51) Int. Cl.
*G02B 15/14* (2006.01)
*G02B 7/02* (2006.01)

(52) U.S. Cl. .................. 359/697; 359/823; 348/345; 396/358

(58) Field of Classification Search .................. 359/697, 359/649, 676, 823, 354, 684, 687, 689, 672, 359/695, 696, 692, 680, 726, 363, 366, 372, 359/557; 348/340, 341, 344, 345, 335, 373, 348/374, 219.1, 240.3, 351; 396/55, 85, 396/133, 351, 358, 447, 529

See application file for complete search history.

(56) References Cited

U.S. PATENT DOCUMENTS

| 4,668,065 | A | * | 5/1987 | Tanaka et al. ................ 396/358 |
| 6,536,960 | B2 | * | 3/2003 | Kubo et al. .................. 396/355 |
| 7,071,973 | B1 | * | 7/2006 | Yoshioka et al. ......... 348/219.1 |
| 7,180,542 | B2 | * | 2/2007 | Iwasawa et al. .......... 348/240.3 |
| 7,430,010 | B2 | * | 9/2008 | Sasakura ..................... 348/345 |
| 2006/0133786 | A1 | * | 6/2006 | Teramoto ..................... 396/55 |

FOREIGN PATENT DOCUMENTS

| JP | 2003-169236 | 6/2003 |
| JP | 2004-251937 | 9/2004 |
| JP | 2004-304831 | 10/2004 |

\* cited by examiner

*Primary Examiner*—Loha Ben
(74) *Attorney, Agent, or Firm*—Hamre, Schumann, Mueller & Larson, P.C.

(57) ABSTRACT

An imaging optical system is configured with a first lens group disposed on a first optical axis and capturing a luminous flux from a subject along the first optical axis, a prism that folds the luminous flux passed through the first lens group toward a direction along a second optical axis that is substantially perpendicular to the first optical axis and second to fifth lens groups disposed on the second optical axis. At the end of the operation, while the first lens group is driven in a direction of the prism along the first optical axis, the second to the fourth lens groups are driven to an initial angle of view position where these lens groups are to be present at the start of the operation. Thereby, an imaging apparatus whose chassis is very thin and that can realize a high pixel counter and a large magnification, while enabling the speeding-up of the starting operation and the ending operation, can be provided.

11 Claims, 17 Drawing Sheets

IMAGING APPARATUS AND DRIVING METHOD OF ITS IMAGING OPTICAL SYSTEM

BACKGROUND OF THE INVENTION

1. Field of the Invention

The present invention relates to an imaging apparatus with a folded zoom optical system and a method of driving its imaging optical system.

2. Description of Related Art

In recent years, a so-called folded optical system has been used generally for the optical system of an imaging apparatus. The folded optical system employs, in order to guide a luminous flux incident from a subject to an imaging element such as a CCD, the configuration of folding the optical axis by means of an optical reflective element such as a prism. The adoption of such a folded optical system allows the flexibility of the optical system layout in an imaging apparatus to be increased as compared with normal optical systems without folding the optical axis, and therefore can contribute to make an imaging apparatus smaller and thinner.

Further, since there is no need to advance a lens barrel from an imaging apparatus, a digital camera employing such a folded zoom optical system has been proposed, which is for speeding up the starting and the ending operations (see JP2004-251937 A, for example). The specific configuration follows. When the shooting ends, the position of a movable lens is not adjusted but the movable lens is allowed to stop at that position, and the position is stored. Then, when the shooting is started, based on the stored position information of the movable lens, the control is started from the state before the end of the shooting. With this configuration, the time required for adjusting the position of the movable lens can be saved, and therefore the processing can be speeded up.

However, the actual products employing the folded zoom optical system as described in JP 2004-251937 A that does not require the lens barrel to advance have the 3× magnification at most, and cannot realize a large magnification of about 10× using the product ready for a high pixel counter such as 4-megapixel or 5-megapixel that has become mainstream recently. This is because a high performance is required also for the optical system in order to realize such a higher pixel counter and a larger magnification, leading to the necessity to increase the diameter of a lens closer to the object side, and this would degrade the effect of a thinner imaging apparatus, which is one of the advantages of the folded optical system. Then, in order to cope with such a problem and realize a thin imaging apparatus while allowing for a higher pixel counter and a larger magnification, the configuration as shown in FIG. 17 can be considered. That is, in a folded zoom optical system including a plurality of lens groups (e.g., first to fifth lens groups G1 to G5 arranged in this order from the object (subject) side to the image surface side), a prism P as a reflective optical element is disposed not in the first lens group G1 but in the second lens group G2, and the first lens group G1 whose lens diameter has to be increased is disposed so that its optical axis (a first optical axis A1) can be in parallel with the thickness direction of the imaging apparatus 1. During shooting (during operation), a collapsible lens barrel portion 2 is advanced as in the normal collapsible lens barrel. Then, the second lens group G2 or later, whose lens diameters are relatively small, are disposed in the direction perpendicular to the thickness direction of the imaging apparatus 1. Thereby, the overall thickness of the imaging apparatus 1 can be made smaller when it is not in use.

However, when such a configuration is employed, the first lens group G1 needs to perform the collapsing operation. Therefore, the ideas of high-speed starting and ending operations as described in JP 2004-251937 A cannot be incorporated, and it will take much time to perform the starting and the ending operations. Especially, when it takes a long time to perform the starting operation of the imaging apparatus, a good opportunity for a photograph will be missed.

SUMMARY OF THE INVENTION

Therefore, with the foregoing in mind, it is an object of the present invention to provide an imaging apparatus whose chassis is very thin and that can realize a high pixel counter and a large magnification, while enabling the speeding-up of the starting operation and the ending operation, and to provide a method of driving its imaging optical system.

In order to attain the above-mentioned object, a first configuration of an imaging apparatus of the present invention includes: a first optical system including at least one lens disposed on a first optical axis and capturing a luminous flux from a subject along the first optical axis; a reflective optical element that folds the luminous flux passed through the first optical system toward a direction along a second optical axis that is substantially perpendicular to the first optical axis; a second optical system including a plurality of lenses disposed on the second optical axis; a first driver that drives the first optical system; and a second driver that drives the second optical system. At the end of an operation of the imaging apparatus, while the first optical system is driven in a direction of the reflective optical element along the first optical axis, the second optical system is driven to an initial angle of view position where the second optical system is to be present at the start of the operation.

With such a process performed at the end of the operation, there is little necessity to move the second optical system at the start of the operation. Therefore, as compared with the conventional imaging apparatus equipped with a normal collapsible lens barrel, almost all of the lens groups of which have to be moved to predetermined positions at the start of the operation, this apparatus can be shifted quickly to the state ready for shooting.

Preferably, the above-stated first configuration of the imaging apparatus of the present invention further includes a reflective optical element driver that drives the reflective optical element. After the reflective optical element is driven to a retraction position, the first optical system may be driven to a storage position along the first optical axis. With this preferred example, the imaging apparatus can be made still thinner while shortening the starting time. Further, in this case, it is preferable that the retraction position of the reflective optical element be on a third axis that is substantially perpendicular to the first optical axis and is provided on a plane including the second optical axis. With this preferred example, the imaging apparatus can be made still thinner. Moreover, since the movement range of the second optical system along the second optical axis and the movement range of the reflective optical element along the third axis do not overlap with each other, there is no need to worry about their colliding. Therefore, since both of the moving processes can be performed at one time, the starting time further can be shortened.

A second configuration of an imaging apparatus of the present invention includes: a first optical system including at least one lens disposed on a first optical axis and capturing a luminous flux from a subject along the first optical axis; a reflective optical element that folds the luminous flux passed through the first optical system toward a direction along a second optical axis that is substantially perpendicular to the first optical axis; a second optical system including a plurality of lenses disposed on the second optical axis; a first driver that drives the first optical system; a second driver that drives the second optical system; and a reflective optical element driver that drives the reflective optical element. At the end of an operation of the imaging apparatus, after the reflective optical element is driven to a retraction position, while the first optical system is driven to a storage position along the first optical axis, the second optical system is driven to a retraction position along the second optical axis so that a distance from an initial angle of view position becomes the minimum while allowing the storage position to be kept. Further, in this case, it is preferable that the retraction position of the reflective optical element be on a third axis that is substantially perpendicular to the first optical axis and is provided on a plane including the second optical axis.

Further, in the above-stated first or second configuration of the imaging apparatus of the present invention, it is preferable that at the start of the operation, the first optical system be driven to an initial angle of view position along the first optical axis. With this preferred example, the apparatus can be shifted more quickly to the state ready for shooting. Further, in this case, it is preferable that the initial angle of view position to which the first optical system is driven be a position corresponding to an angle of view such that a moving distance of the first optical system becomes the minimum at the start of the operation. With this preferred example, the apparatus can be ready for shooting in a short time period.

Further, a method for driving an imaging optical system according to the present invention is a driving method of the imaging optical system at the end of an operation thereof. The method includes the steps of driving a first optical system along its optical axis in a direction opposite to a subject; and driving a second optical system to an initial angle of view position where the second optical system is to be present at the start of the operation, an optical axis of the second optical system being substantially perpendicular to the optical axis of the first optical system.

With such a process performed at the end of the operation, there is little necessity to move the second optical system at the start of the operation. Therefore, as compared with the conventional imaging apparatus equipped with a normal collapsible lens barrel, almost all of the lens groups of which have to be moved to predetermined positions at the start of the operation, this apparatus can be shifted quickly to the state ready for shooting.

In the method for driving an imaging optical system of the present invention preferably further includes the step of driving a reflective optical element to a retraction position, the reflective optical element guiding a luminous flux passed through the first optical system to the second optical system. With this preferred example, the imaging apparatus can be made still thinner, while shortening the starting time.

According to the present invention, an imaging apparatus whose chassis is very thin and that can realize a high pixel counter and a large magnification, while enabling the speeding-up of the starting operation and the ending operation, can be provided.

Further, even when a configuration for retracting a reflective optical element such as a prism is employed in order to make the apparatus still thinner, lens groups can be moved speedily while avoiding the collision between the lens groups, so that the starting time can be shortened.

Therefore, the present invention is effective for enhancing the response of a user interface of an imaging apparatus.

These and other advantages of the present invention will become apparent to those skilled in the art upon reading and understanding the following detailed description with reference to the accompanying figures.

DETAILED DESCRIPTION OF THE INVENTION

In an imaging apparatus of the present invention, when the shooting ends, a first lens group G1 is collapsed, and at the same time, by using the time required for this collapsing (collapsing time), lens groups on an optical axis subjected to the folding (a second optical axis A2) are moved to a position corresponding to their initial angle of view shooting initial angle of view position). Herein, when the initial angle of view is set at an angle of view such that the moving amount from the collapsed position of the first lens group G1 (advancing amount) can be minimized, there is no need to move the lens groups on the second optical axis A2 when the shooting is started. In this way, at the start of the shooting, only the first lens group on the optical axis before the folding (a first optical axis A1) is moved and the movement amount thereof can be minimized, and therefore the time required for the starting can be minimized. Further, the processing time at the end of the shooting can be just the collapsing time of the first lens group G1, which is substantially the minimum requirement. In the case of an imaging apparatus equipped with a normal collapsible lens barrel, when the apparatus is not in use, the first lens group has to travel substantially the distance corresponding to the total of the air-spacing distances between all of the lens groups when it is in use, in order to minimize the overall length in the optical axis direction in the collapsed state. On the other hand, in the case of an imaging apparatus equipped with a collapsible folded lens barrel of the present invention, the first lens group G1 need be moved only by the air-spacing distance from the second lens group G2 depending on the angle of view, and therefore the starting operation can be speeded up.

The following describes the present invention more specifically by way of preferred embodiments.

Embodiment 1

Figure 1A:
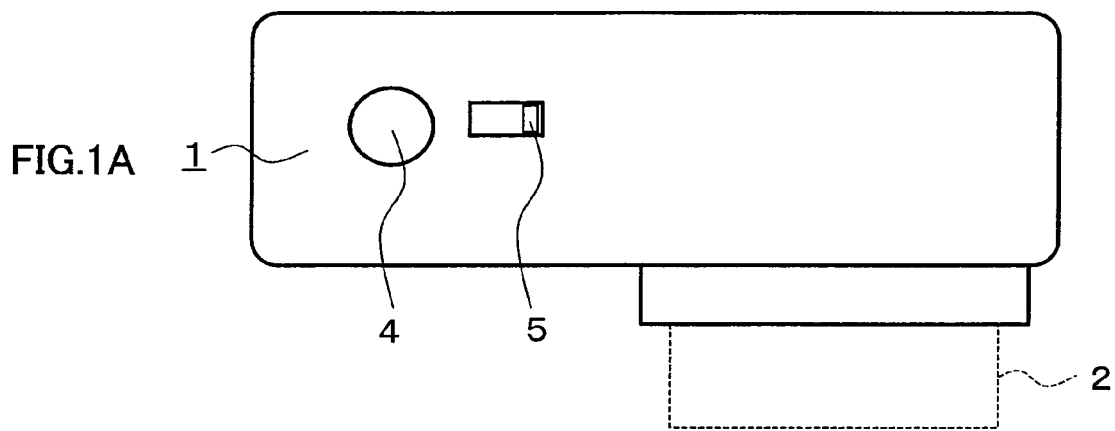
FIG. 1A is a top plan view of an imaging apparatus according to one embodiment of the present invention.
Figure 1B:
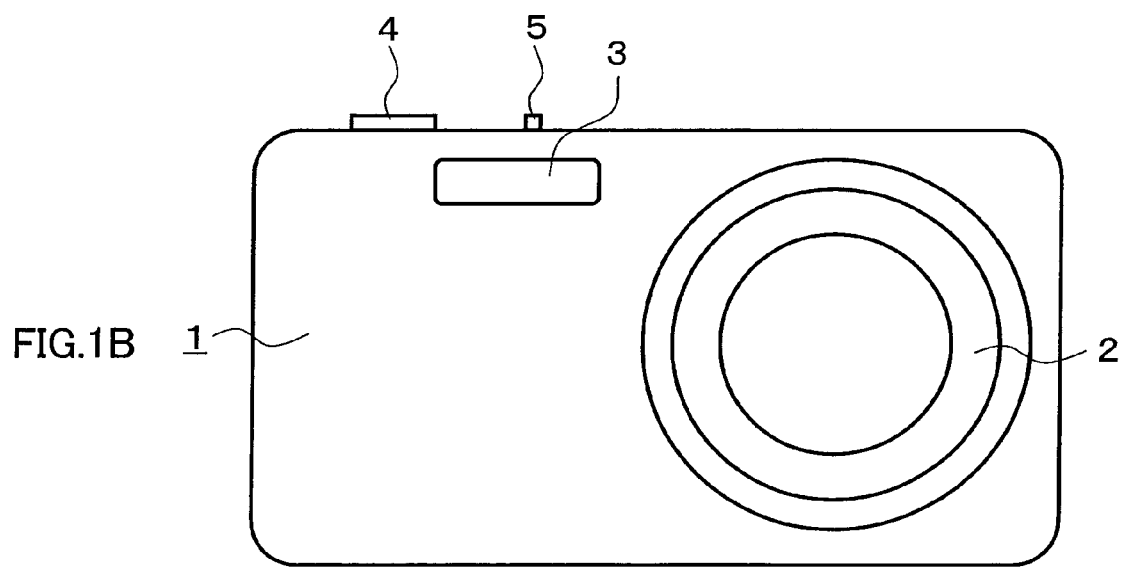
FIG. 1B is a front view of an imaging apparatus according to one embodiment of the present invention.
Figure 2:
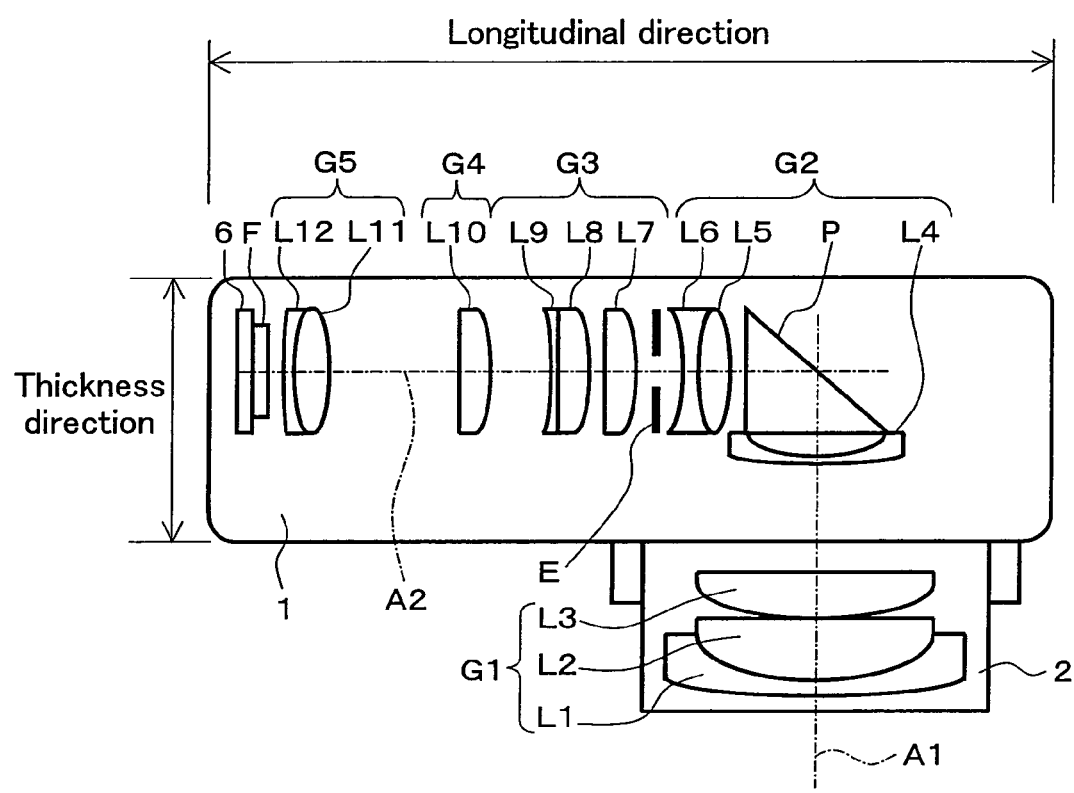
FIG. 2 is a schematic view of the optical configuration when a first lens group of an imaging apparatus is advanced according to Embodiment 1 of the present invention.
Figure 3:
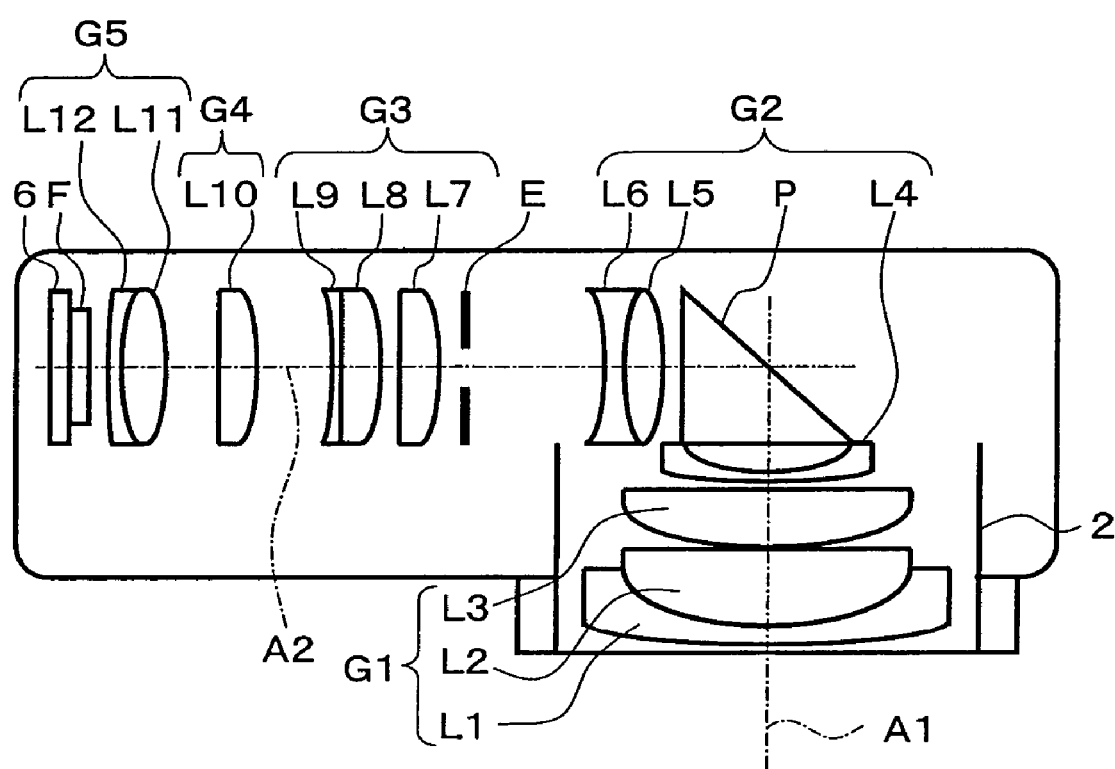
FIG. 3 is a schematic view of the optical configuration when the first lens group of the imaging apparatus is collapsed according to Embodiment 1 of the present invention.
Figure 4:
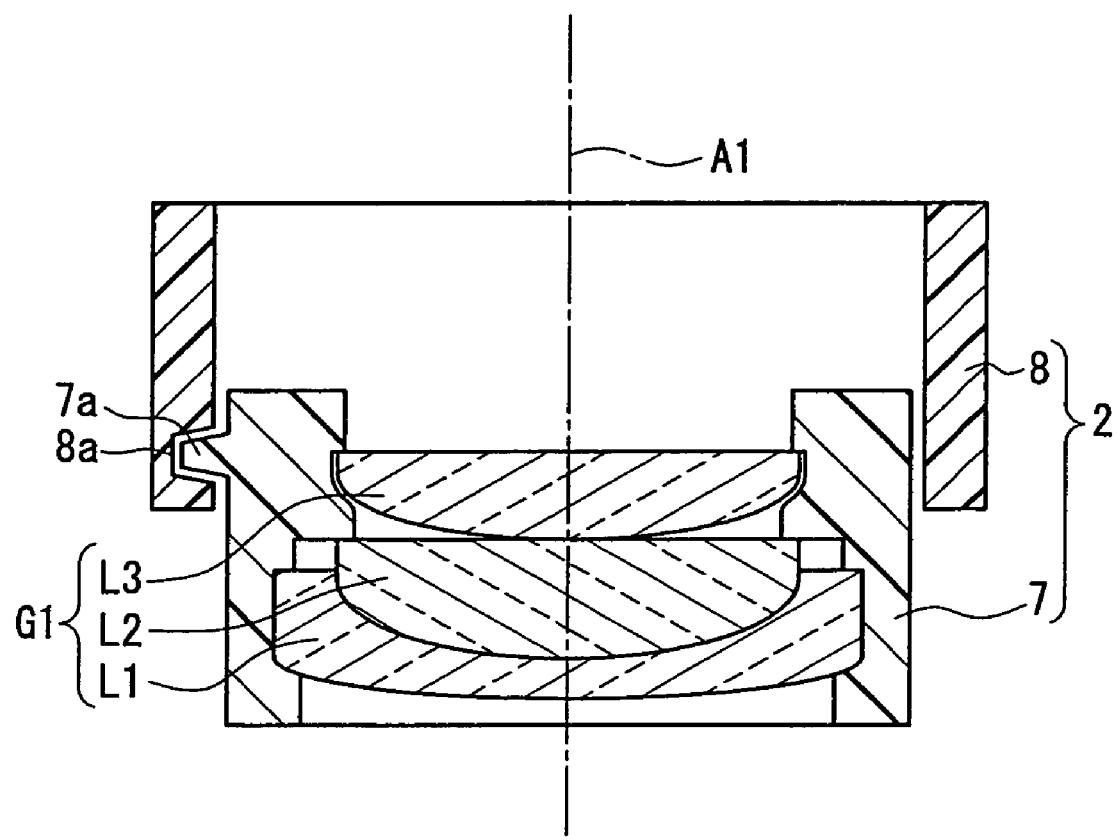
FIG. 4 is a cross-sectional view of an exemplary mechanism for driving the lens groups of an imaging apparatus according to one embodiment of the present invention.
Figure 5:
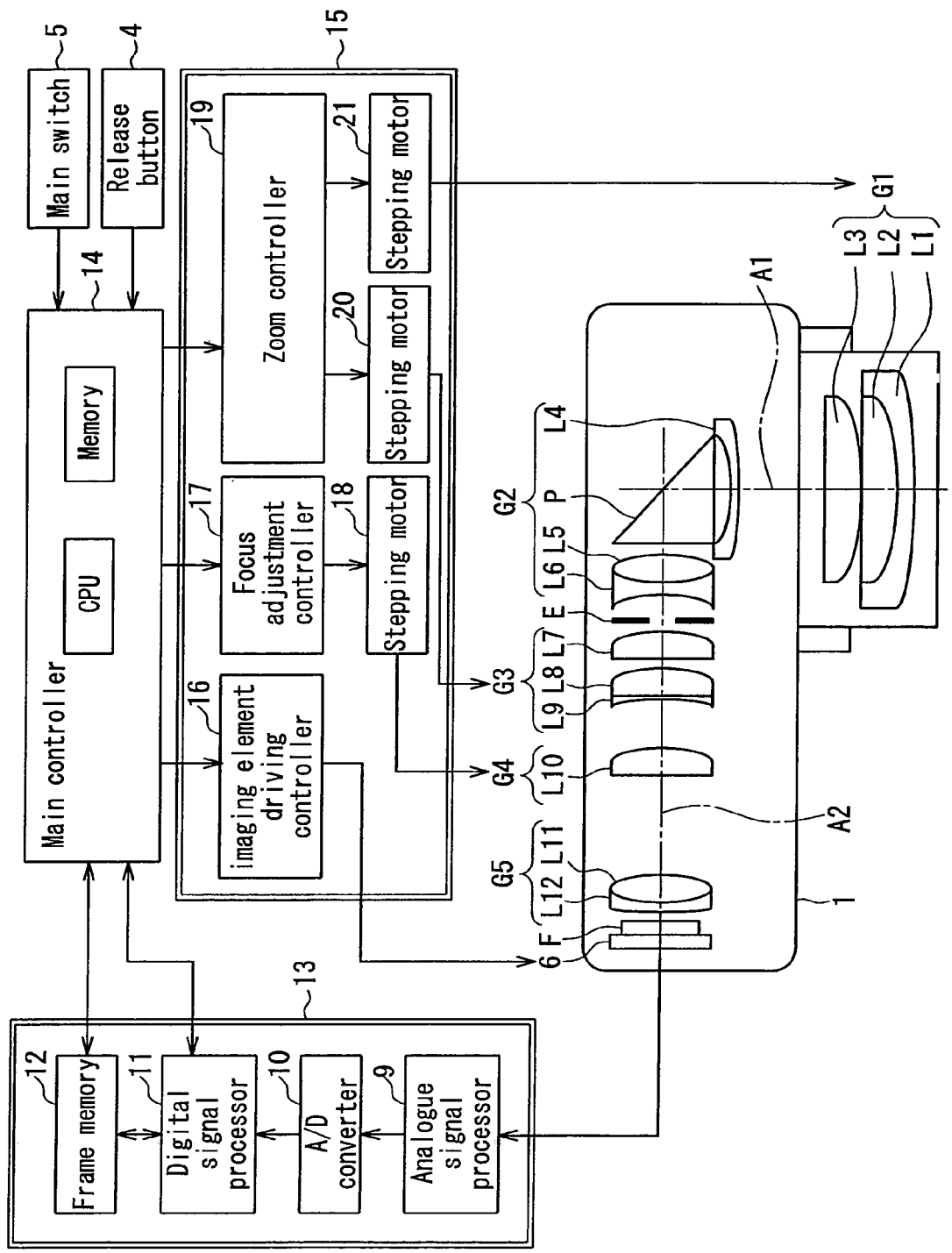
FIG. 5 is a block diagram of the circuit configuration of the imaging apparatus according to Embodiment 1 of the present invention.
Figure 6:
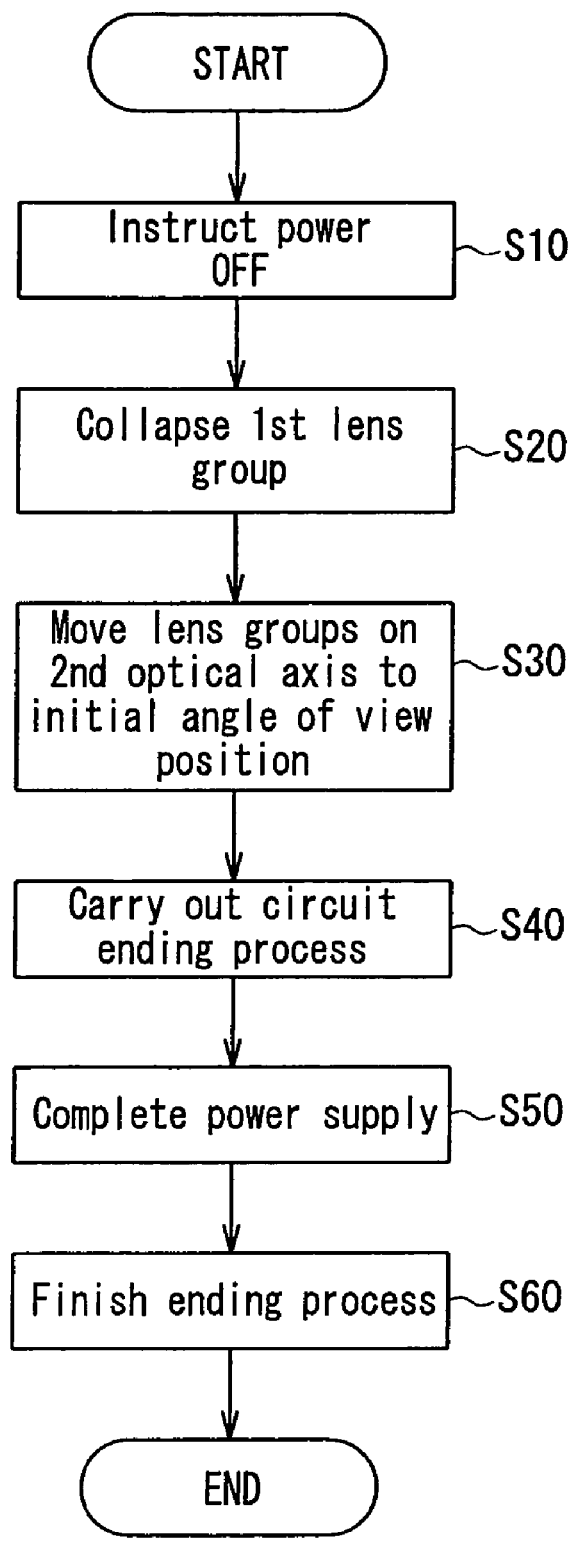
FIG. 6 is a process flowchart when the operation of the imaging apparatus ends according to Embodiment 1 of the present invention.
Figure 7:
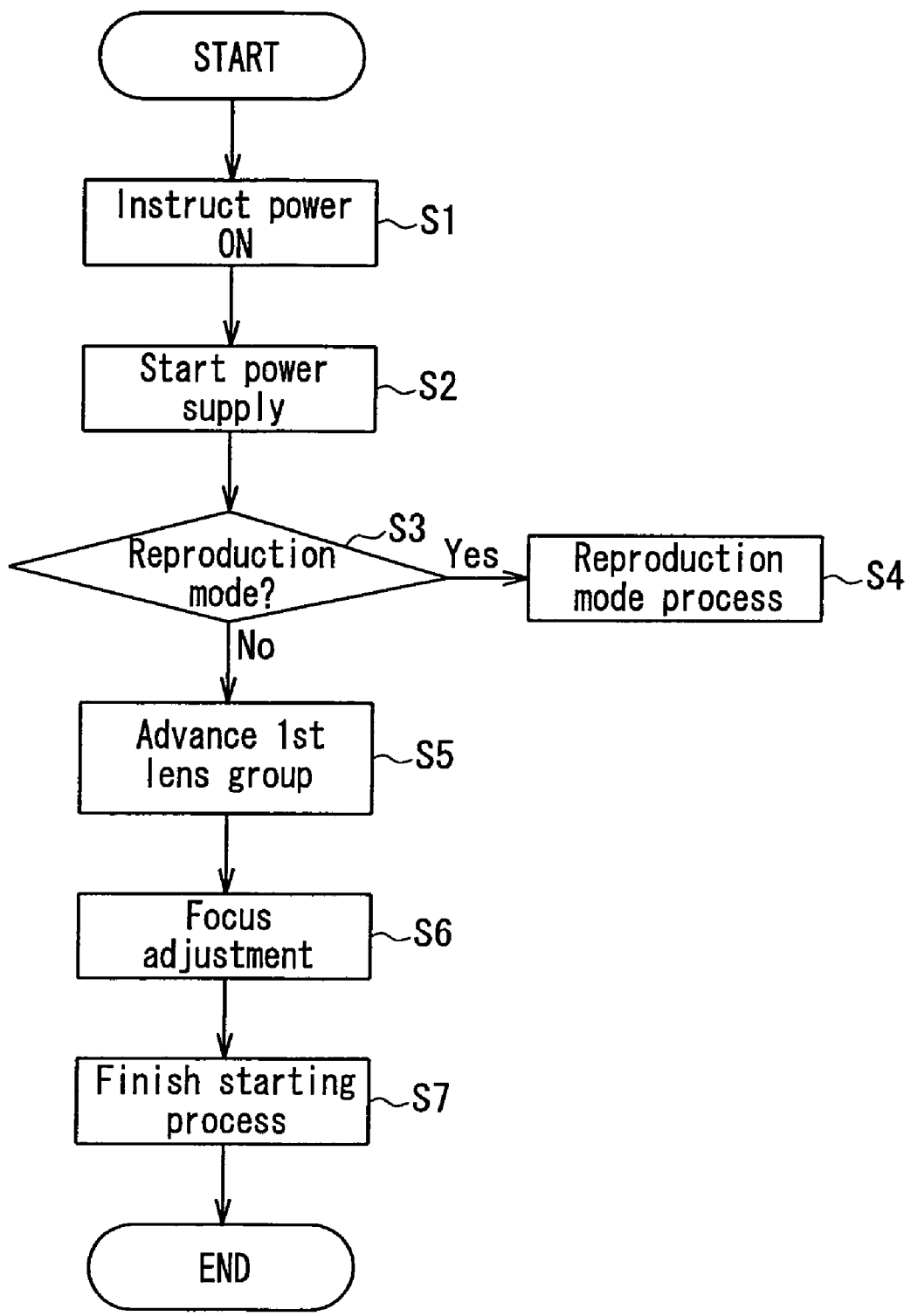
FIG. 7 is a process flowchart when the operation of the imaging apparatus starts according to Embodiment 1 of the present invention.

An imaging apparatus of Embodiment 1 of the present invention will be described below, with reference to FIG. 1 to FIG. 7. FIG. 1A is a top plan view of the imaging apparatus according to Embodiment 1 of the present invention and FIG. 1B is a front view of such an imaging apparatus. FIG. 2 is a schematic view of the optical configuration when a first lens group of the imaging apparatus is advanced. FIG. 3 is a schematic view of the optical configuration when the first lens group of the imaging apparatus is collapsed. FIG. 4 is a cross-sectional view of an exemplary mechanism for driving the lens groups of the imaging apparatus. FIG. 5 is a block diagram of the circuit configuration of the imaging apparatus. FIG. 6 is a process flowchart when the operation of the imaging apparatus ends. FIG. 7 is a process flowchart when the operation of the imaging apparatus starts.

Firstly, the configuration of the imaging apparatus of the present embodiment will be described, with reference to FIG. 1A and FIG. 1B.

As shown in FIG. 1A and FIG. 1B, the imaging apparatus 1 of the present embodiment has a chassis in substantially a rectangular parallelepiped shape that is thin in the front-rear direction, in which an imaging optical system and an imaging element, described below, are housed. The front face of the imaging apparatus 1 is provided with a collapsible lens barrel portion 2 that will be placed at the object-side end of the imaging optical system and a flash light-emission portion 3. When the apparatus is in use, the collapsible lens barrel portion 2 is advanced from the chassis of the imaging apparatus 1 (see dotted lines of FIG. 1A), and when it is not in use, the collapsible lens barrel portion 2 is collapsed in the chassis of the imaging apparatus 1. The top face of the imaging apparatus 1 is provided with a release button 4 and a main switch 5. The release button 4 is operated to instruct shooting, and the main switch 5 is operated to instruct the starting and the ending of the operation of the imaging apparatus 1 as a whole.

The rear face of the imaging apparatus 1 is provided with a display (not illustrated) made of a liquid crystal display (LCD) that is for displaying a captured image, a through image, a menu and the like. The imaging apparatus 1 further is provided with a zoom lever (not illustrated) for performing a zooming operation, a switch for selecting operation modes (not illustrated) and the like. The major operation modes include three modes of a camera mode for capturing a still image, a motion image mode for capturing a motion image and a reproduction mode for reproducing and displaying the images recorded in a memory card.

The optical configuration of the imaging apparatus of the present embodiment will be described below, with reference to FIG. 2 and FIG. 3.

As shown in FIG. 2 and FIG. 3, the imaging optical system of the present embodiment includes a first lens group G1, a second lens group G2, a third lens group G3, a fourth lens group G4 and a fifth lens group G5 arranged in this order from the object (subject) side to the image surface side. Herein, the first lens group G1 is composed of three lenses L1 to L3, the second lens group G2 is composed of three lenses L4 to L6 and a prism P as a reflective optical element, the third lens group G3 is composed of three lenses L7 to L9, the fourth lens group G4 is composed of one lens L10, and the fifth lens group G5 is composed of two lenses L11 and L12.

The first lens group G1 is fixed inside the collapsible lens barrel portion 2 so as to be disposed on the first optical axis A1. As the collapsible lens barrel portion 2 is advanced (the state of FIG. 2) or collapsed (the state of FIG. 3), the first lens group G1 can move correspondingly in the direction of the first optical axis A1. Herein, the first optical axis A1 is oriented substantially in parallel with the thickness direction (illustrated in FIG. 2) of the imaging apparatus 1, and a luminous flex from the subject is captured in the first lens group G1 along the first optical axis A1. The prism P included in the second lens group G2 folds the luminous flux from the subject that passed through the first lens group G1 toward the direction along the second optical axis A2. The second optical axis A2 intersects with the first optical axis A1 at substantially right angles, and is substantially in parallel with the longitudinal direction (illustrated in FIG. 2) of the imaging apparatus 1. The second lens group G2 is fixed inside the chassis. The third lens group G3 is disposed on the second optical axis A2 so as to be movable in the direction of the second optical axis A2. The first lens group G1 and the third lens group G3 form a zoom lens group, and the zooming can be carried out by moving these first lens group G1 and third lens group G3 in coordination. The fourth lens group G4 is disposed on the second optical axis A2 so as to be movable in the direction of the second optical axis A2. The fourth lens group G4 forms a focus lens group, and the focus can be adjusted by moving this fourth lens group G4 in the direction of the second optical axis A2. The fifth lens group G5 is fixed on the second optical axis A2 and in front of a low-pass filter F and an imaging element 6 (on the subject side).

The imaging element 6 converts an image formed by the imaging optical system into an electric signal, and outputs it as an analog video signal. As the imaging element 6, a charge coupled device (CCD), a complementary metal-oxide semiconductor (CMOS) or the like can be used.

The low-pass filter F is fastened to the front face of the imaging element 6, and cuts a higher frequency of the imaged pattern that will be a noise component at the imaging element 6.

Further, an aperture stop E is provided immediately in front of (on the subject side) of the third lens group G3. A distance between the aperture stop E and the third lens group G3 is made constant (fixed), and when the third lens group G3 moves, the aperture stop E also moves integrally with the third lens group G3.

Note here that although the prism P is used as the reflective optical element in the present embodiment, the reflective optical element is not limited to the prism P. For example, a flat-plate mirror can be used for the reflective optical element.

FIG. 2 shows the state where the collapsible lens barrel portion 2 is advanced so that the imaging optical system of the imaging apparatus 1 is located at the telephoto end shooting position. FIG. 3 shows the state where the collapsible lens barrel portion 2 is collapsed so that the imaging optical system of the imaging apparatus 1 is at a storage position in the non-use state. As shown in FIG. 2 and FIG. 3, as the first lens group G1 is advanced to the subject side, the third lens group G3 and the fourth lens group G4 move correspondingly to the second lens group G2 side. Further, as shown in FIG. 3, as the collapsible lens barrel portion 2 is collapsed, the third lens group G3 and the fourth lens group G4 move toward the wide-angle end shooting position. That is, when the apparatus is not in use, the third lens group G3 and the fourth lens group G4 move closer to the imaging element 6 than in the telephoto end shooting position of FIG. 2.

The following describes a driving mechanism (mechanical configuration) for moving the first lens group, with reference to FIG. 4. In FIG. 2 and FIG. 3, the first lens group G1 is described to be fixed at the collapsible lens barrel portion 2 for simplifying the explanation. In other words, in the above description, as such a collapsible lens barrel portion 2 moves on the first optical axis A1, the first lens group G1 correspondingly moves on the first optical axis A1. In the following, the mechanism for driving this first lens group G1 will be described in detail.

As shown in FIG. 4, the collapsible lens barrel portion 2 is composed of a lens group fixing member 7 and a cam 8 for moving the lens groups (hereinafter called "lens group moving cam"). The first lens group G1 is fixed inside the lens group fixing member 7 by adhesion, caulking or the like. Further, the lens group fixing member 7 is housed within the lens group moving cam 8. The outer peripheral face of the lens group fixing member 7 is provided with a projection 7a. The inner peripheral face of the lens group moving cam 8 is provided with a substantially helical-shaped groove 8a. Then, the projection 7a on the lens group fixing member 7 enters into the groove 8a of the lens group moving cam 8 so as to contact with the wall face thereof.

The lens group fixing member 7 is supported so as to be movable in the direction of the first optical axis A1 but not rotatable around the first optical axis A1. On the other hand, the lens group moving cam 8 is supported so as to be rotatable around the first optical axis A1 but not movable in the direction of the first optical axis A1. The lens group fixing member 7 is moved by rotating the lens group moving cam 8 by means of a stepping motor 21 described later. That is, as the lens group moving cam 8 is rotated, the projection 7a slides along the substantially spiral-shaped groove 8a, so that the lens group fixing member 7 moves in the direction of the first optical axis A1.

Note here that the helical pitch of the groove 8a of the lens group moving cam 8 need not be constant, but is set so that the first lens group G1 can be positioned appropriately at all the angles of view from the wide-angle end to the telephoto end.

In the above, the driving mechanism by means of the combination of the projection and the groove is exemplified. However, the driving mechanism is not limited to such a configuration. For example, a screw hole may be provided at one end of a frame for fixing the lens groups so that a lead screw is allowed to pass through this screw hole. Then, the lens groups may be driven by rotating the lead screw by means of a motor.

Also as the driving mechanism for the third lens group G3 and the fourth lens group G4, a configuration similar to that described above can be adopted.

The following describes the main circuit configuration of the imaging apparatus of the present embodiment, with reference to FIG. 5.

As shown in FIG. 5, the imaging apparatus 1 includes a main controller 14 that controls the overall operation of the apparatus, an image processor 13 that generates image data from a signal obtained by the imaging element 6 and a driving controller 15 that carries out zooming and focus adjustment in accordance with the control by the main controller 14.

The image processor 13 is composed of an analog signal processor 9 that processes an analog video signal output from the imaging element 6, an A/D converter 10 that is a converter that converts the analog video signal output from the analog signal processor 9 into a digital signal, a digital signal processor 11 that applies digital signal processing such as white balance adjustment, noise reduction and edge enhancement with respect to the video signal that is the digital signal converted by the A/D converter 10, and a frame memory 12 that stores temporarily the captured image subjected to the processing by the digital signal processor 11 and output therefrom.

The driving controller 15 is composed of an imaging element driving controller 16 that drives and controls the imaging element 6, the stepping motor 21 that drives the first lens group G1, a stepping motor 20 that drives the third lens group G3, a zoom controller 19 that drives the stepping motors 20 and 21 for controlling the zooming, a stepping motor 18 that drives the fourth lens group G4 and a focus adjustment controller 17 that controls the focus adjustment by driving the stepping motor 18.

The main controller 14 that controls the overall operation of the imaging apparatus 1 has a central processing unit (CPU) that plays a predominant role of the control and a memory. The memory stores programs with the procedure described therein and parameters such as positional relationships between the distance from the shooting object (subject), the angle of view and the position of the fourth lens group G4 (focus lens group). The focus adjustment is controlled by a servo method, i.e., by moving the fourth lens group G4 in a direction such that the contrast of the image captured by the imaging element 6 can be increased and the fourth lens group G4 is positioned where the contrast becomes the maximum. For the purpose of the focus adjustment control, the main controller 14 estimates the contrast by using the image data stored in the frame memory 12 of the image processor 13.

Further, signals put out from the main switch 5 for instructing ON/OFF of the power supply of the imaging apparatus 1 and from the release button 4 for instructing shooting are received by the main controller 14, which then are controlled appropriately.

Note here that although the imaging optical system composed of the five lens groups is exemplified in the present embodiment, the imaging optical system is not limited to such a configuration. The imaging optical system may be any one as long as it is a folded optical system and a zoom optical system such that the lens groups located on the subject side relative to a reflective optical element are advanced when it is in use and are collapsed when it is not in use.

The following describes the operation of the thus configured imaging apparatus of the present embodiment, with reference to FIG. 4 to FIG. 7.

Firstly, referring to FIG. 4 to FIG. 6, the process at the end of the operation (at the end of the use) will be described below.

In the imaging apparatus 1 of the present embodiment, when the main switch 5 is operated during the operation so as to issue an instruction for turning OFF of the power supply (S10), the lens group moving cam 8 firstly is rotated by the stepping motor 21, so that the lens group fixing member 7 moves in the direction of the first optical axis A1, whereby the first lens group G1 is collapsed (S20). Then, at almost the same time as this operation, the third lens group G3 and the fourth lens group G4, which form a movable lens group on the second optical axis A2, are moved to a predetermined initial angle of view position by the stepping motors 20 and 18 (S30). Herein, the predetermined initial angle of view position refers to the zoom position where when the first lens group G1 is advanced at the start of the operation, the advancing amount becomes the minimum (i.e., the moving distance of the first lens group G1 becomes the minimum). For instance, in the case where the first lens group G1 has a positive power and the second lens group G2 is in the fixed state, the distance between the first lens group G1 and the second lens group G2 will be the minimum (i.e., both lens groups become the closest to each other) in general at the wide-angle end shooting position. Such a case is assumed herein. In this way, the present embodiment is configured so that when the first lens group G1 is collapsed, the third lens group G3 and the fourth lens group G4 move at the wide-angle end shooting position.

Strictly speaking, the position of the fourth lens group G4 forming the focus lens group on the second optical axis A2 at the wide-angle end shooting position varies with a distance from the subject. Therefore, the fourth lens group G4 may be moved to the position satisfying the distance from the subject of about 2 to 5 m, which can be considered to be relatively frequently used for shooting an image of people, for example.

Next, the circuit ending process required for a general imaging apparatus such as saving of internal parameters, erasing of the display and saving of an image, if required, is carried out (S40).

Finally, the supply of the power is completed (S50).

In this way, the ending process is finished (S60), and the imaging apparatus 1 is in the operation stopping state.

Next, referring to FIG. 4, FIG. 5 and FIG. 7, the process at the start of the operation (at startup) will be described below.

In the imaging apparatus 1 of the present embodiment, when the main switch 5 is operated during the stopping so as to issue an instruction of turning ON of the power supply (S1), the supplying of power is started first (S2). Then, the main controller 14 makes a judgment of the mode (S3). If the reproduction mode is set, a reproduction mode processing is performed (S4). At the startup in the reproduction mode, the lens groups do not move. Since the operation in this mode is not of specific concern for the present invention, the detailed description thereof is omitted. If the camera mode or the motion image mode involving the movement of the lens groups is set, the lens group moving cam 8 is rotated by the stepping motor 21 so that the lens group fixing member 7 moves in the direction of the first optical axis A1, whereby the first lens group G1 is advanced to the wide-angle end shooting position (S5). Next, the focus adjustment is carried out by adjusting the position of the fourth lens group G4 in accordance with the servo control for the focus adjustment (S6).

Thereby, the starting operation is completed (S7), and the imaging apparatus 1 becomes ready for shooting.

The above-stated processing performed at the end of the operation can minimize the moving distance of the first lens group G1 at the start of the operation. Further, there is no need to move the third lens group G3. Moreover, the focus adjustment can be finished with a relatively small moving amount of the fourth lens group G4.

Therefore, according to the configuration of the imaging apparatus 1 of the present embodiment, the apparatus can be shifted quickly to the state ready for shooting as compared with the conventional imaging apparatus equipped with a normal collapsible lens barrel in which almost all of the lens groups have to be moved to predetermined positions at the start of the operation.

Embodiment 2

Figure 8:
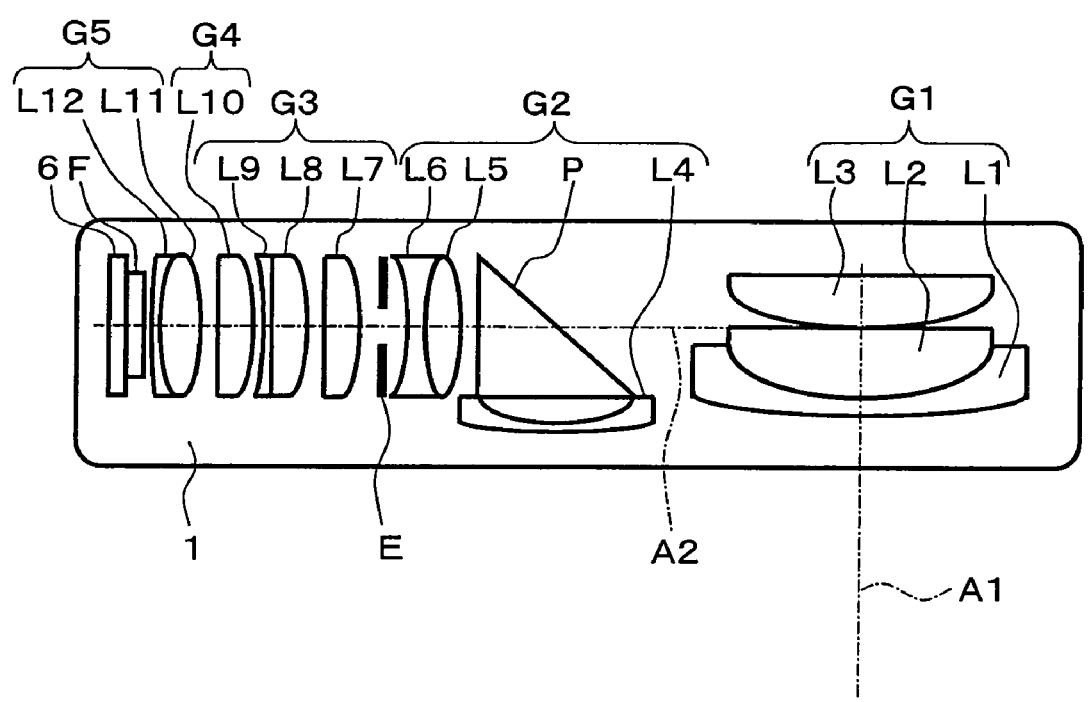
FIG. 8 is a schematic view of the optical configuration when a first lens group of an imaging apparatus is collapsed according to Embodiment 2 of the present invention.
Figure 9:
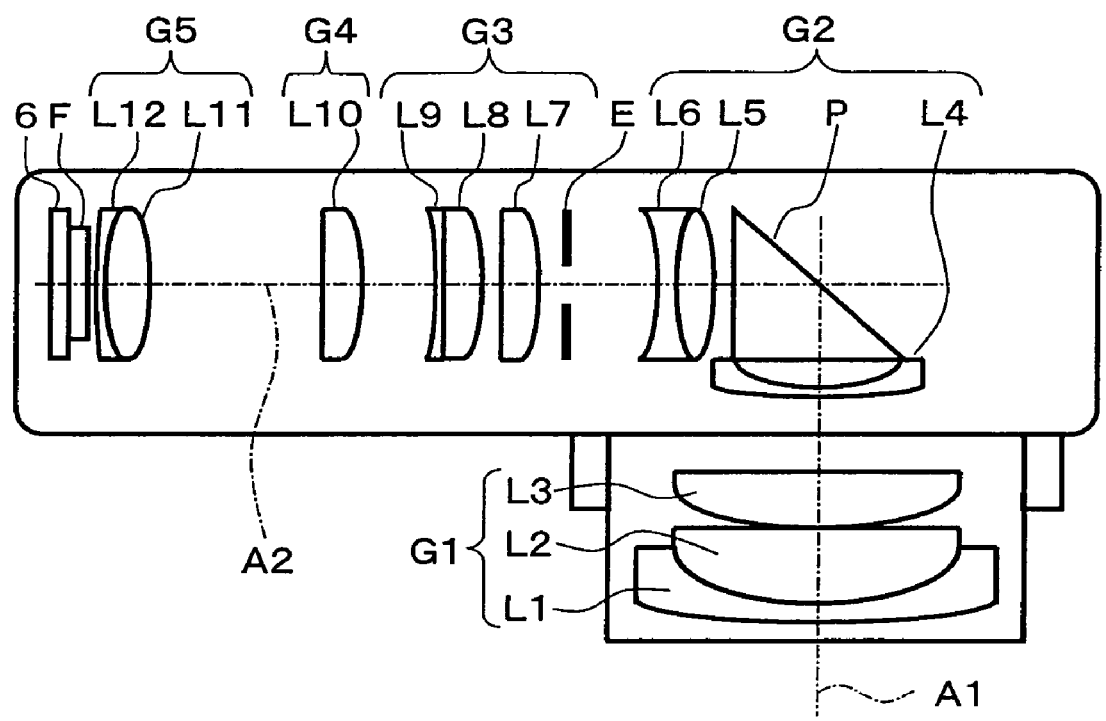
FIG. 9 is a schematic view of the optical configuration when the first lens group of the imaging apparatus is advanced according to Embodiment 2 of the present invention.
Figure 10:
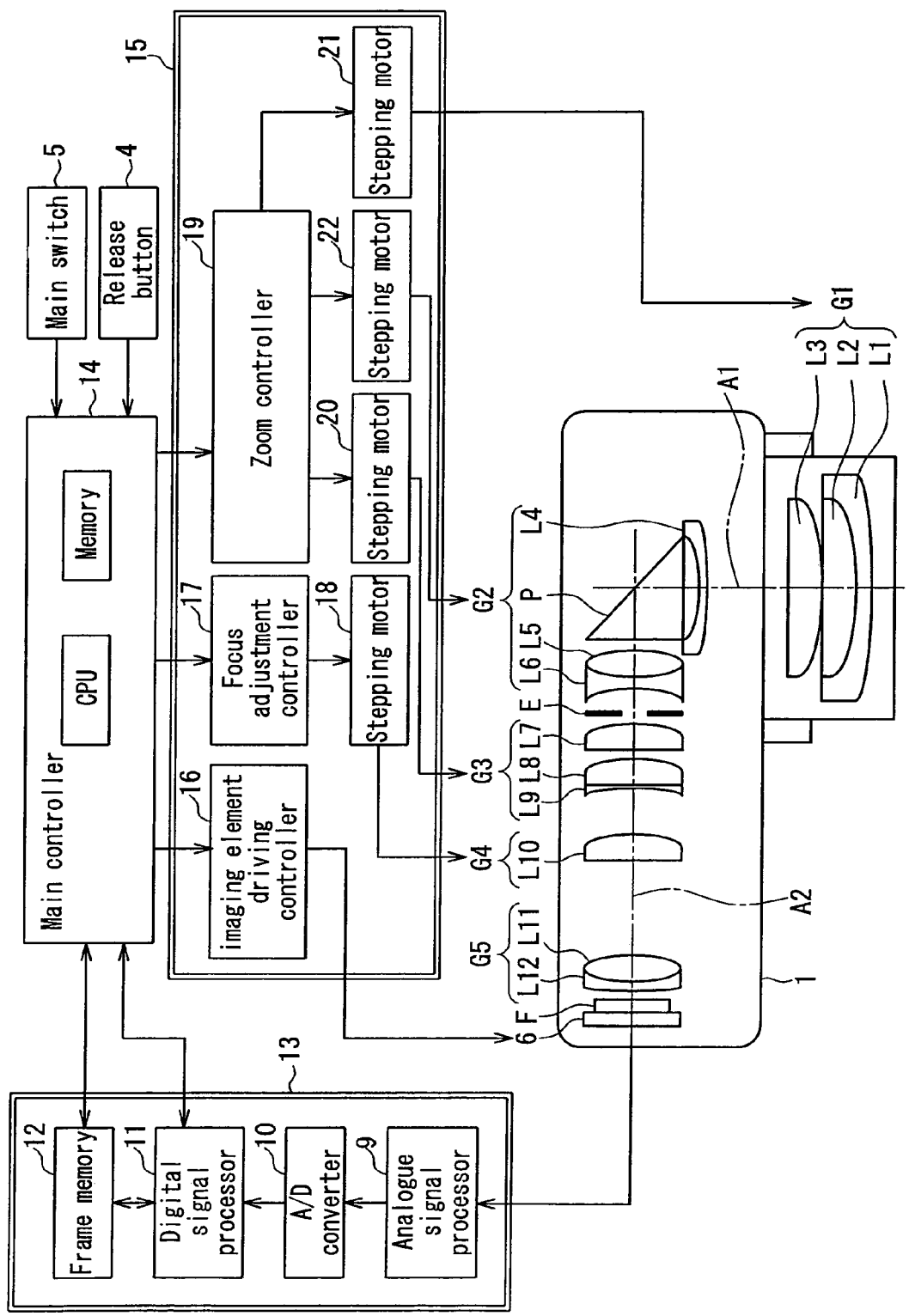
FIG. 10 is a block diagram of the circuit configuration of the imaging apparatus according to Embodiment 2 of the present invention.
Figure 11:
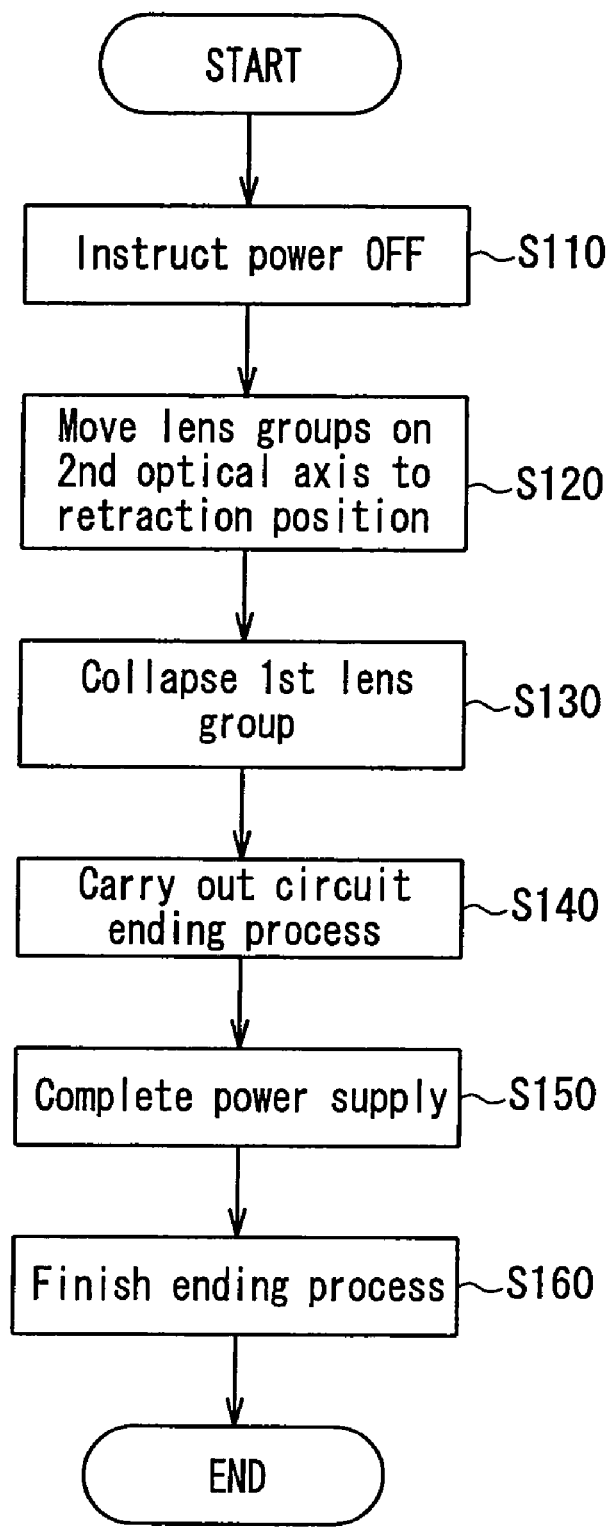
FIG. 11 is a process flowchart when the operation of the imaging apparatus ends according to Embodiment 2 of the present invention.
Figure 12:
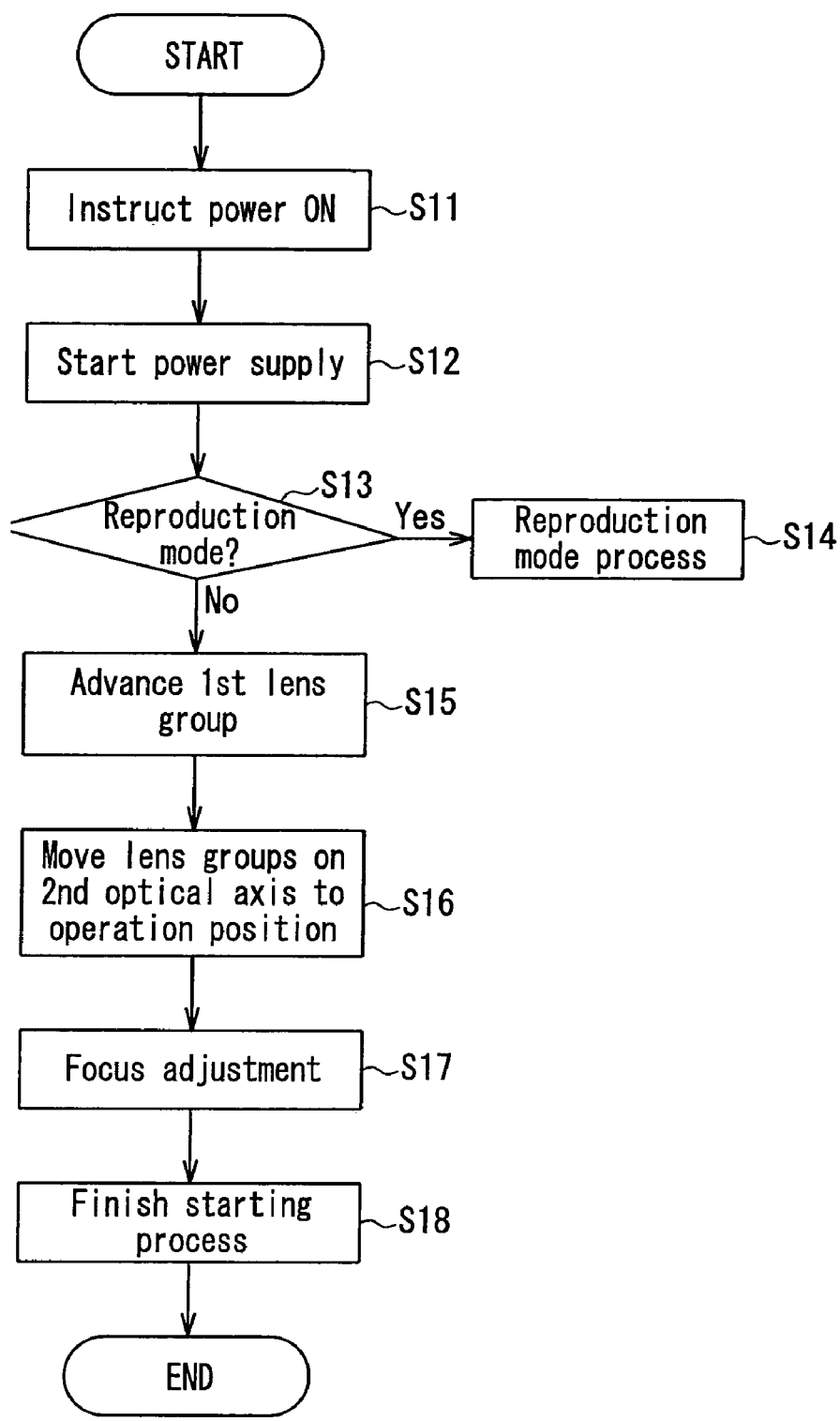
FIG. 12 is a process flowchart when the operation of the imaging apparatus starts according to Embodiment 2 of the present invention.

An imaging apparatus of Embodiment 2 of the present invention will be described below, with reference to FIG. 8 to FIG. 12. FIG. 8 is a schematic view of the optical configuration when a first lens group of the imaging apparatus is collapsed according to Embodiment 2 of the present invention. FIG. 9 is a schematic view of the optical configuration when the first lens group of the imaging apparatus is advanced. FIG. 10 is a block diagram of the circuit configuration of the imaging apparatus. FIG. 11 is a process flowchart when the operation of the imaging apparatus ends. FIG. 12 is a process flowchart when the operation of the imaging apparatus starts.

In the imaging apparatus 1 of the present embodiment, similarly to the case of the above-described Embodiment 1, a folded zoom optical system including a collapsible mechanism is adopted. With this configuration, the chassis of the apparatus can be made significantly thin, and a higher pixel counter and a large magnification can be realized. Further, the starting process can be speeded up without causing a mechanical failure.

The optical configuration of the present embodiment is the same as the optical configuration of the above-stated Embodiment 1. A difference between the imaging apparatus 1 of the present embodiment and the imaging apparatus 1 of Embodiment 1 resides in the storage method of the respective lens groups when it is not in use. The imaging apparatus 1 of the present embodiment has a feature in the method of moving the lens groups present on the second optical axis A2.

In the following description, the same reference numerals are assigned to the elements common to the above-stated Embodiment 1 and their explanations are omitted. A portion different from the above-stated Embodiment 1 only will be described below.

In FIG. 8, showing the collapsed state of the first lens group G1 of the present embodiment, a difference from the above-stated Embodiment 1 resides in that a second lens group G2 to a fourth lens group G4 and an aperture stop E on the second optical axis A2 are moved to the imaging element 6 side along the second optical axis A2, and a space formed as a result is used as a storage position in which the first lens group G1 is retracted. With this configuration, the imaging optical system can be stored in a more compact form than the case of the above-stated Embodiment 1. The optical layout of FIG. 9 showing the state where the first lens group G1 is advanced is the same as in the case of the above-stated Embodiment 1.

A difference between the circuit configuration of the imaging apparatus 1 of the present embodiment and the circuit configuration of the imaging apparatus 1 of the above-stated Embodiment 1 resides in that, as shown in FIG. 10, a stepping motor 22 for driving the second lens group G2 is added. As the lens group driving mechanism, one similar to the above-stated Embodiment 1 can be used.

The following describes the operation of the thus configured imaging apparatus of the present embodiment, with reference to FIG. 10 to FIG. 12.

Firstly, referring to FIG. 10 and FIG. 11, the process at the end of the operation (at the end of the use) will be described below.

In the imaging apparatus 1 of the present embodiment, when the main switch 5 is operated during the operation so as to issue an instruction of turning OFF of the power supply (S110), the second lens group G2 to the fourth lens group G4, which form a movable lens group on the second optical axis A2, are moved (retracted) to the imaging element 6 side by the stepping motors 22, 20 and 18, in order to keep the space for allowing the first lens group G1 to retract (storage position) (S120). In this case, the moving amount for retracting of the lens groups on the second optical axis A2 may be the amount for ensuring the retracting space of the first lens group G1. Therefore, although the second lens group G2 to the fourth lens group G4 are moved (retracted) to the imaging element 6 side in the above description, the present embodiment is not limited to such a configuration. For example, if the retracting space for the first lens group G1 can be kept sufficiently only by making the second lens group G2 retract, there is no need to make the third lens group G3 and the fourth lens group G4 retract. Then, in such a case, in order to shorten the starting time, the third lens group G3 and the fourth lens group G4 may be moved to their initial angle of view position (e.g., the wide-angle end shooting position). Alternatively, the second lens group G2 to the fourth lens group G4 may be moved (retracted) at the retraction position where the distance from the initial angle of view position becomes the minimum distance that can keep the retracting space (storage position) of the first lens group G1. The fifth lens group G5 also can be driven and retracted, if required.

In this way, when the retracting space for the first lens group G1 can be kept, the lens group moving cam 8 is rotated by the stepping motor 21 so that the lens grouping member 7 is moved in the direction of the first optical axis A1 (see FIG. 4), whereby the first lens group G1 is collapsed to the retracting space (S130).

Next, the circuit ending processing required for a general imaging apparatus such as saving of internal parameters, erasing of the display and saving of an image, if required, is carried out (S140).

Finally, the supply of the power is completed (S150).

In this way, the ending process is finished (S160), and the imaging apparatus 1 is in the operation stopping state.

Next, referring to FIG. 10 and FIG. 12, the operation at the start of the operation (at startup) will be described below.

In the imaging apparatus 1 of the present embodiment, when the main switch 5 is operated during the stopping so as to issue an instruction of turning ON of the power supply (S1), the supplying of power is started first (S12). Then, the main controller 14 makes a judgment of the mode (S13). If the reproduction mode is set, a reproduction mode processing is performed (S14). At the startup in the reproduction mode, the lens groups do not move. Since the operation in this mode is not of specific concern for the present invention, the detailed description thereof is omitted. If the camera mode or the motion image mode involving the movement of the lens groups is set, similarly to the case of the above-stated Embodiment 1, the first lens group G1 is advanced to the position where the advancing amount becomes the minimum (also in this embodiment, similarly to the case of the above-stated Embodiment 1, it is assumed that the zoom position with the least advancing amount is at the wide-angle end shooting position) (S15). Next, the second lens group G2 to the fourth lens group G4, which form a movable lens group on the second optical axis A2, are moved to the operation position on the second optical axis A2 by the stepping motors 22, 20 and 18 (S16). Herein, the operation position refers to the position ready for shooting, and in this instance refers to the wide-angle end shooting position. More specifically, the second lens group G2 is moved to the fixing position during the operation (during the shooting), and the third lens group G3 and the fourth lens group G4 are moved to the wide-angle end shooting position. Next, the focus adjustment is carried out by adjusting the position of the fourth lens group G4 in accordance with the servo control for the focus adjustment (S17).

Thereby, the starting operation is completed (S18), and the imaging apparatus 1 becomes ready for shooting.

In the step where the lens groups on the second optical axis A2 are moved to the operation position on the second optical axis A2 (S16), in order to avoid the collision between the lens groups, the lens groups may be moved successively from the one faraway from the imaging element 6. However, in such a case, it will take a long time to perform the starting operation. Then, in order to speed up the starting operation, the plurality of lens groups on the second optical axis A2 may be moved at one time. At this time, in order to avoid the collision, assuming that the moving speed on the second optical axis A2 of the n-th lens group is Sn (where n is a natural number, in the present embodiment, n=2, 3), the control may be performed so as to satisfy the following Expression 1. This is because a lens group having a smaller value of n is farther away from the imaging element 6:

$$Sn \geqq S(n+1) \quad \text{(Expression 1)}$$

Such control allows the speedy movement of the lens groups while avoiding the collision between the lens groups securely, and therefore the time required for the starting operation can be shortened.

Embodiment 3

Figure 13:
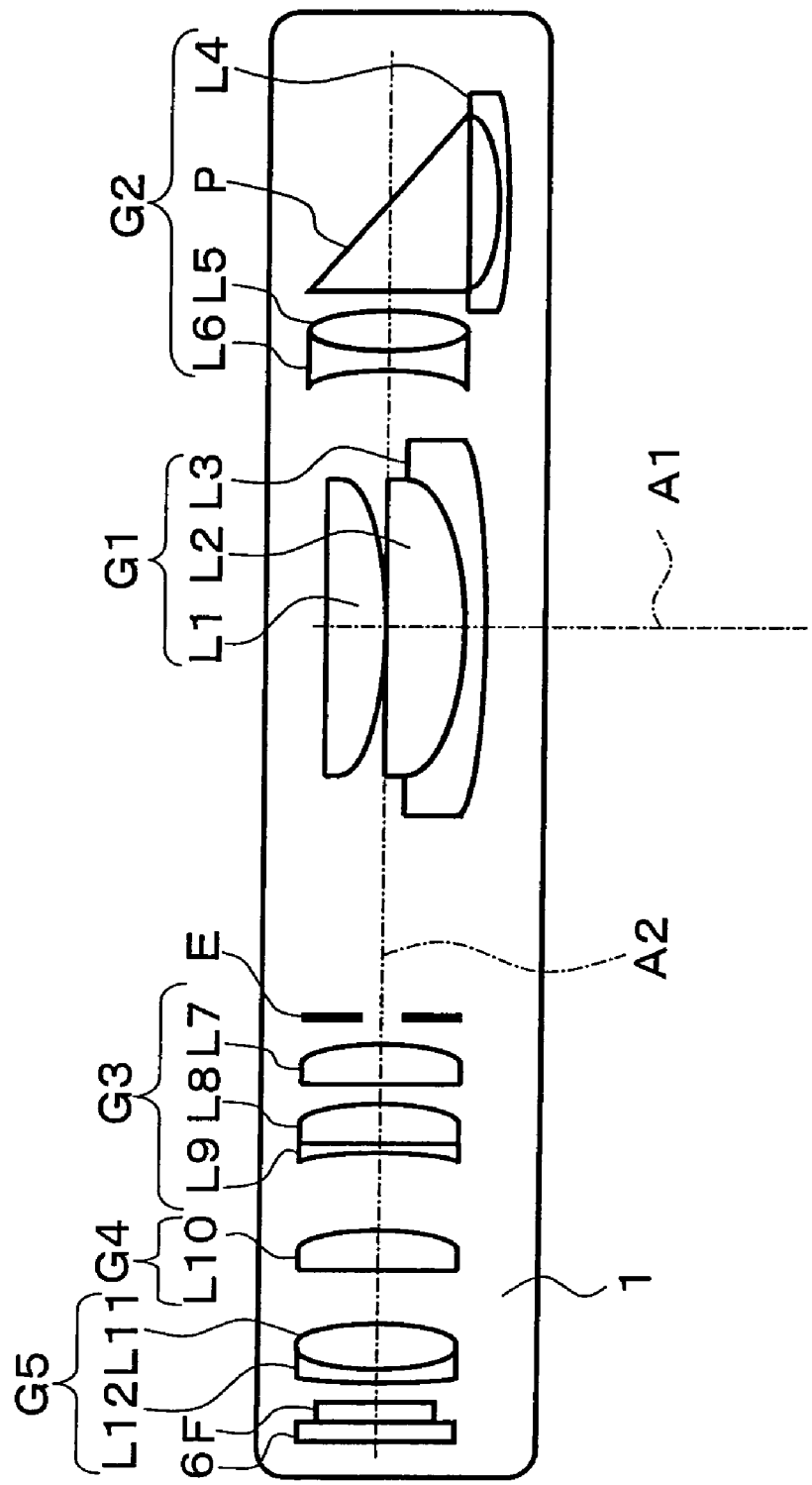
FIG. 13 is a schematic view of the optical configuration when a first lens group of an imaging apparatus is collapsed according to Embodiment 3 of the present invention.
Figure 14:
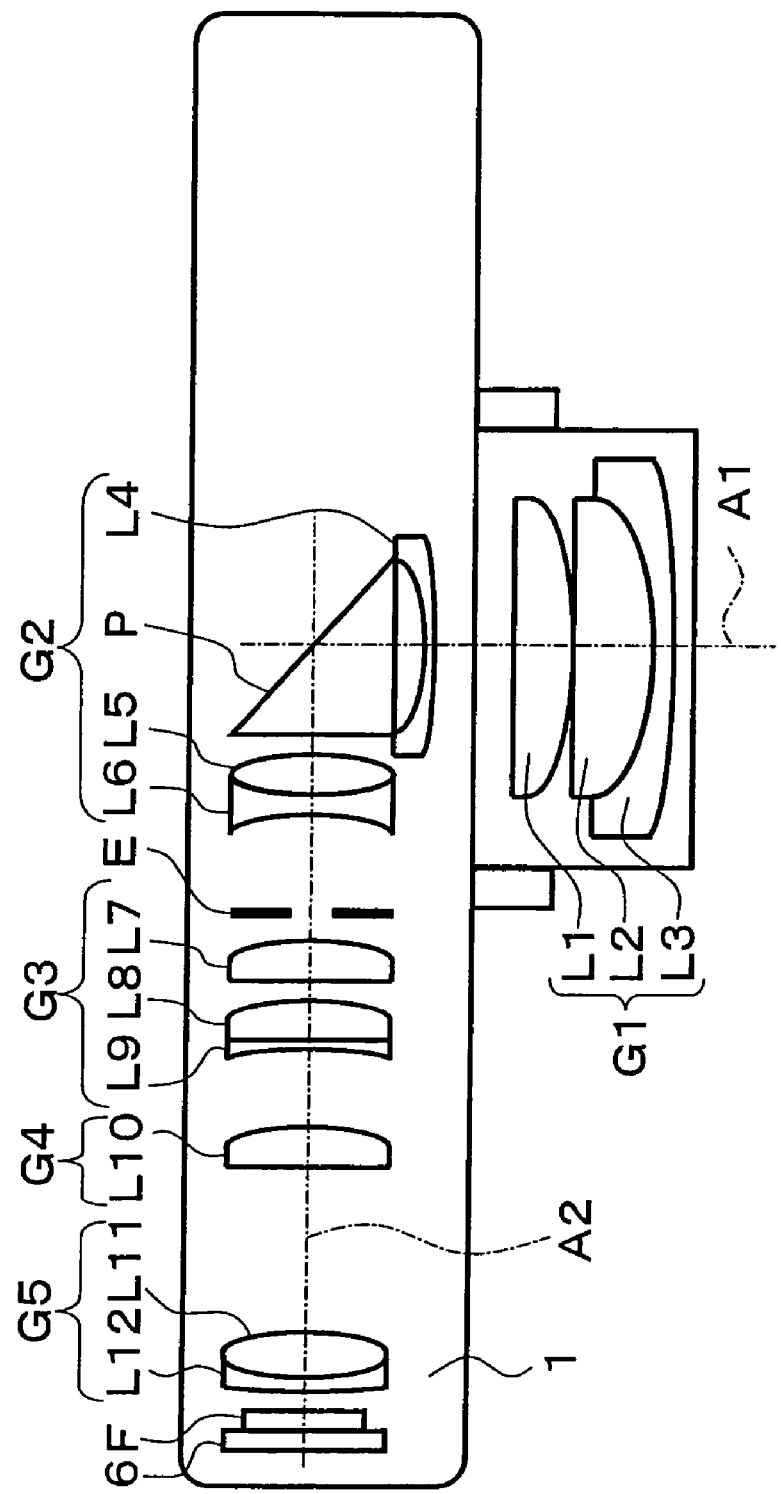
FIG. 14 is a schematic view of the optical configuration when the first lens group of the imaging apparatus is advanced according to Embodiment 3 of the present invention.
Figure 15:
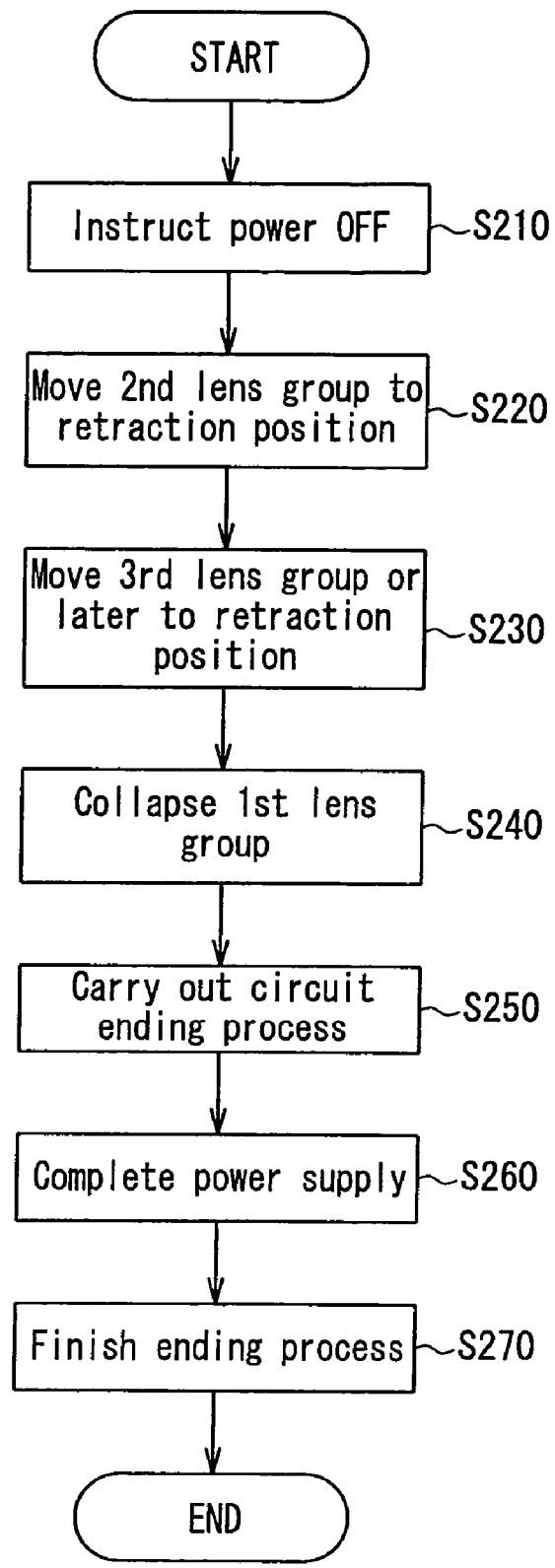
FIG. 15 is a process flowchart when the operation of the imaging apparatus ends according to Embodiment 3 of the present invention.
Figure 16:
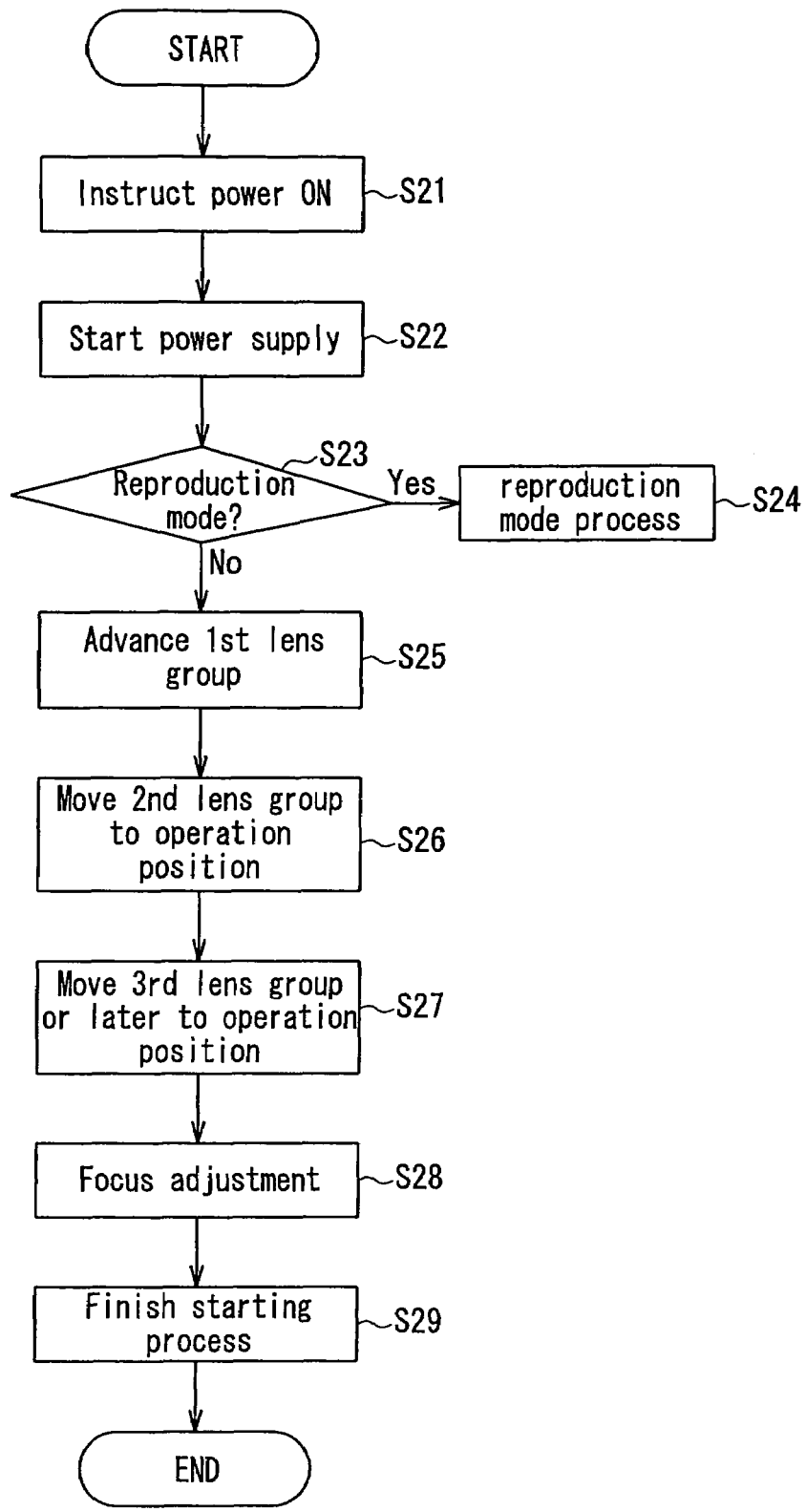
FIG. 16 is a process flowchart when the operation of the imaging apparatus starts according to Embodiment 3 of the present invention.
Figure 17:
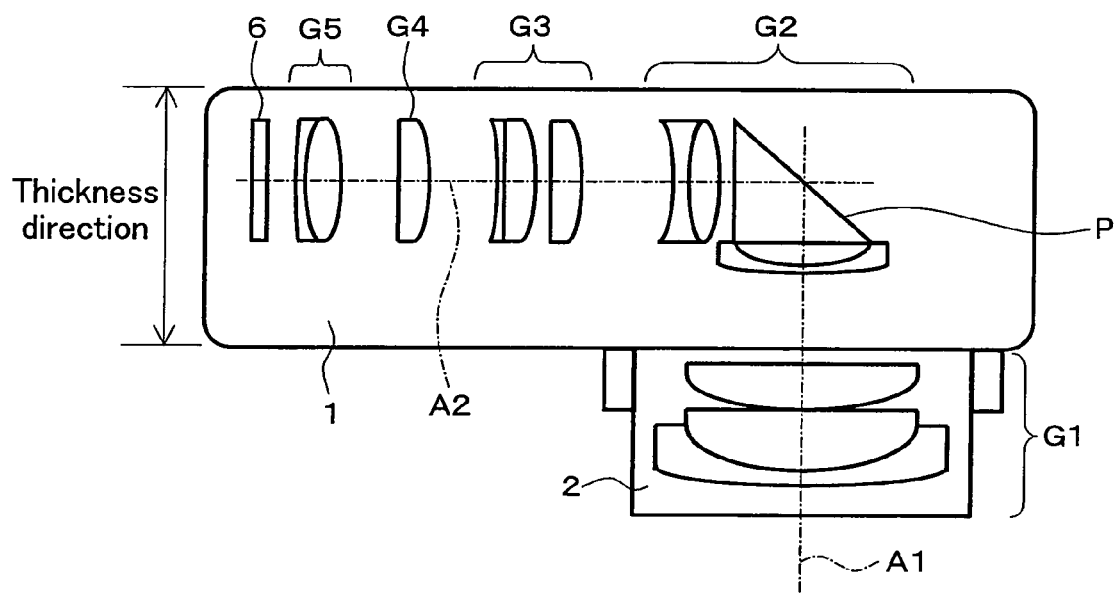
FIG. 17 is a schematic view of the arrangement of a folded zoom optical system in a conventional imaging apparatus.

An imaging apparatus of Embodiment 3 of the present invention will be described below, with reference to FIG. 13 to FIG. 16. FIG. 13 is a schematic view of the optical configuration when a first lens group of the imaging apparatus is collapsed according to Embodiment 3 of the present invention. FIG. 14 is a schematic view of the optical configuration when the first lens group of the imaging apparatus is advanced. FIG. 15 is a process flowchart when the operation of the imaging apparatus ends. FIG. 16 is a process flowchart when the operation of the imaging apparatus starts.

In the imaging apparatus 1 of the present embodiment, similarly to the case of the above-described Embodiment 1 and Embodiment 2, a folded zoom optical system including a collapsible mechanism is adopted. With this configuration, the chassis of the apparatus can be made significantly thin, and a higher pixel counter and a large magnification can be realized. Further, the starting process can be speeded up without causing a mechanical failure.

The optical configuration of the present embodiment is the same as the optical configuration of the above-stated Embodiment 2. A difference between the imaging apparatus 1 of the present embodiment and the imaging apparatus 1 of Embodiment 2 resides in the storage method of the respective lens groups when it is not in use. The imaging apparatus 1 of the present embodiment has a feature in the method of moving the lens groups including a prism.

In the following description, the same reference numerals are assigned to the elements common to the above-stated Embodiment 2 and their explanations are omitted. A portion different from the above-stated Embodiment 2 only will be described below.

In FIG. 13, showing the collapsed state of the first lens group G1 of the present embodiment, a difference from the above-stated Embodiment 2 resides in that a second lens group G2 including a prism P is moved to the side opposite to the imaging element 6 on the second optical axis A2. The lens groups other than the second lens group G2 on the second optical axis A2, i.e., a third lens group G3, a fourth lens group G4 and an aperture stop E, are moved to the imaging element 6 side on the second optical axis A2, if required. Then, the first lens group G1 is retracted to a space formed as a result. With this configuration, the imaging optical system can be stored in a more compact form than the case of the above-stated Embodiment 1. The optical layout of FIG. 14 showing the state where the first lens group G1 is advanced is the same as in the case of the above-stated Embodiment 1 and Embodiment 2.

The circuit configuration of the imaging apparatus 1 of the present embodiment may be the same as that of the above-stated Embodiment 2 (FIG. 10). Further, as the lens group driving mechanism, one similar to the above-stated Embodiment 1 can be used.

The following describes the operation of the thus configured imaging apparatus of the present embodiment, with reference to FIG. 10 and FIG. 13 to FIG. 16.

Firstly, referring to FIG. 10 and FIG. 13 to FIG. 15, the process at the end of the operation (at the end of the use) will be described below.

In the imaging apparatus 1 of the present embodiment, when the main switch 5 is operated during the operation so as to issue an instruction of turning OFF of the power supply (S210), the second lens group G2 including the prism P is moved (retracted) to the side opposite to the imaging element 6 on the second optical axis A2 by the stepping motor 22, in order to keep the space for allowing the first lens group G1 to retract (storage position) (S220). Next, the remaining lens groups on the second optical axis A2, i.e., the third lens group G3 and the fourth lens group G4, are moved (retracted) to the imaging element 6 side on the second optical axis A2 by the stepping motors 20 and 18 (S230). Similarly to the above-stated Embodiment 2, the moving amount for retracting of the lens groups on the second optical axis A2 may be the amount for ensuring the retracting space of the first lens group G1. For instance, if the retracting space for the first lens group G1 can be kept sufficiently only by making the second lens group G2 retract, there is no need to make the third lens group G3 and the fourth lens group G4 retract. Then, in such a case, in order to shorten the starting time, the third lens group G3 and the fourth lens group G4 may be moved to their initial angle of view position (e.g., the wide-angle end shooting position). Alternatively, the second lens group G2 to the fourth lens group G4 may be moved (retracted) to the retraction position where the distance from the initial angle of view position becomes the minimum distance that can keep the retracting space (storage position) of the first lens group G1.

In this way, when the retracting space for the first lens group G1 can be kept, the lens group moving cam 8 is rotated by the stepping motor 21 so that the lens group fixing member 7 is moved in the direction of the first optical axis A1 (see FIG. 4), whereby the first lens group G1 is collapsed to the retracting space (S240).

Next, the circuit ending processing required for a general imaging apparatus such as saving of internal parameters, erasing of the display and saving of an image, if required, is carried out (S250).

Finally, the supply of the power is completed (S260).

In this way, the ending process is finished (S270), and the imaging apparatus 1 is in the operation stopping state.

Next, referring to FIG. 10, FIG. 13, FIG. 14 and FIG. 16, the process at the start of the operation (at startup) will be described below.

In the imaging apparatus 1 of the present embodiment, when the main switch 5 is operated during the stopping so as to issue an instruction of turning ON of the power supply (S21), the supplying of power is started first (S22). Then, the main controller 14 makes a judgment of the mode (S23). If the reproduction mode is set, a reproduction mode processing is performed (S24). At the startup in the reproduction mode, the lens groups do not move. Since the operation in this mode is not of specific concern for the present invention, the detailed description thereof is omitted. If the camera mode or the motion image mode involving the movement of the lens groups is set, similarly to the case of the above-stated Embodiment 1, the first lens group G1 is advanced to the position where the advancing amount becomes the minimum (also in this embodiment, similarly to the case of the above-stated Embodiment 1, it is assumed that the zoom position with the least advancing amount is at the wide-angle end shooting position) (S25). Next, the second lens group G2 is moved to the imaging element 6 side on the second optical axis A2 by the stepping motor 22, and is fixed at the operation position on the second optical axis A2 (S26). At almost the same time as this operation, the third lens group G3 and the fourth lens group G4 on the second optical axis A2 are moved to the operation position on the second optical axis A2 by the stepping motors 20 and 18 (S27). Herein, the operation position refers to the position ready for shooting, and in this instance refers to the wide-angle end shooting position. Next, the focus adjustment is carried out by adjusting the position of the fourth lens group G4 in accordance with the servo control for the focus adjustment (S28).

Thereby, the starting operation is completed (S29), and the imaging apparatus 1 becomes ready for shooting.

In the imaging apparatus 1 of the present embodiment, since the movement range of the second lens group G2 and the movement range of the third lens group G3 or later do not overlap with each other, there is no need to worry about the collision of these lens groups. Therefore, since the moving of the second lens group G2 (S26) and the moving of the third lens group or later (S27) can be performed at one time, the starting time can be shortened.

Note here that in the present embodiment although the second lens group G2 is moved to the side opposite to the imaging element 6 on the second optical axis A2, the present embodiment is not limited to such a configuration. For instance, a third axis substantially perpendicular to the first optical axis A1 and residing in a plane including the second optical axis A2 may be assumed, and the second lens group G2 may be retracted in that direction.

As stated above, according to the present invention, an imaging apparatus whose chassis is very thin and that can realize a high pixel counter and a large magnification, while enabling the speeding-up of the starting operation and the ending operation, can be provided. Therefore, the present invention is suitable for a digital camera required to be thin and ready for a high pixel counter.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An imaging apparatus, comprising:
    a first optical system comprising at least one lens disposed on a first optical axis and capturing a luminous flux from a subject along the first optical axis;
    a reflective optical element that folds the luminous flux passed through the first optical system toward a direction along a second optical axis that is substantially perpendicular to the first optical axis;
    a second optical system comprising a plurality of lenses disposed on the second optical axis;
    a first driver that drives the first optical system; and
    a second driver that drives the second optical system,
    wherein at the end of an operation of the imaging apparatus, while the first optical system is driven in a direction of the reflective optical element along the first optical axis, the second optical system is driven to an initial angle of view position where the second optical system is to be present at the start of the operation.

2. The imaging apparatus according to claim 1, further comprising a reflective optical element driver that drives the reflective optical element,
    wherein after the reflective optical element is driven to a retraction position, the first optical system is driven to a storage position along the first optical axis.

3. The imaging apparatus according to claim 2, wherein the retraction position of the reflective optical element is on a third axis that is substantially perpendicular to the first optical axis and is provided on a plane including the second optical axis.

4. The imaging apparatus according to claim 1, wherein at the start of the operation, the first optical system is driven to an initial angle of view position along the first optical axis.

5. The imaging apparatus according to claim 4, wherein the initial angle of view position to which the first optical system is driven is a position corresponding to an angle of view such that a moving distance of the first optical system becomes the minimum at the start of the operation.

6. An imaging apparatus, comprising:
    a first optical system comprising at least one lens disposed on a first optical axis and capturing a luminous flux from a subject along the first optical axis;
    a reflective optical element that folds the luminous flux passed through the first optical system toward a direction along a second optical axis that is substantially perpendicular to the first optical axis;
    a second optical system comprising a plurality of lenses disposed on the second optical axis;
    a first driver that drives the first optical system;
    a second driver that drives the second optical system; and
    a reflective optical element driver that drives the reflective optical element,
    wherein at the end of an operation of the imaging apparatus, after the reflective optical element is driven to a retraction position, while the first optical system is driven to a storage position along the first optical axis, the second optical system is driven to a retraction position along the second optical axis so that a distance from an initial angle of view position becomes the minimum while allowing the storage position to be kept.

7. The imaging apparatus according to claim 6, wherein the retraction position of the reflective optical element is on a third axis that is substantially perpendicular to the first optical axis and is provided on a plane including the second optical axis.

8. The imaging apparatus according to claim 6, wherein at the start of the operation, the first optical system is driven to an initial angle of view position along the first optical axis.

9. The imaging apparatus according to claim 8, wherein the initial angle of view position to which the first optical system is driven is a position corresponding to an angle of view where a moving distance of the first optical system becomes the minimum at the start of the operation.

10. A method for driving an imaging optical system at the end of an operation thereof, comprising the steps of:
    driving a first optical system along its optical axis in a direction opposite to a subject; and
    driving a second optical system to an initial angle of view position where the second optical system is to be present at the start of the operation, an optical axis of the second optical system being substantially perpendicular to the optical axis of the first optical system.

11. The method for driving an imaging optical system according to claim 10, further comprising the step of driving a reflective optical element to a retraction position, the reflective optical element guiding a luminous flux passed through the first optical system to the second optical system.

* * * * *